United States Patent
Liljestrand et al.

(10) Patent No.: US 12,505,698 B2
(45) Date of Patent: Dec. 23, 2025

(54) ANTI-SPOOFING SYSTEM

(71) Applicant: Smart Eye AB, Gothenburg (SE)

(72) Inventors: Simon Liljestrand, Gothenburg (SE); Kenneth Jonsson, Gothenburg (SE); John Finér, Gothenburg (SE); Stefan Klintberg, Gothenburg (SE)

(73) Assignee: Smart Eye AB, Gothenburg (SE)

( * ) Notice: Subject to any disclaimer, the term of this patent is extended or adjusted under 35 U.S.C. 154(b) by 329 days.

(21) Appl. No.: 18/013,966

(22) PCT Filed: Jul. 1, 2021

(86) PCT No.: PCT/EP2021/068192
§ 371 (c)(1),
(2) Date: Dec. 30, 2022

(87) PCT Pub. No.: WO2022/003107
PCT Pub. Date: Jan. 6, 2022

(65) Prior Publication Data
US 2023/0290185 A1    Sep. 14, 2023

(30) Foreign Application Priority Data
Jul. 1, 2020 (EP) .................................... 20183434

(51) Int. Cl.
*G06V 40/18* (2022.01)
*G06F 3/01* (2006.01)
(Continued)

(52) U.S. Cl.
CPC .............. *G06V 40/18* (2022.01); *G06F 3/013* (2013.01); *G06T 7/20* (2013.01); *G06V 10/141* (2022.01);
(Continued)

(58) Field of Classification Search
None
See application file for complete search history.

(56) References Cited

U.S. PATENT DOCUMENTS

| 8,437,513 B1 | 5/2013 | Derakhshani et al. |
| 2013/0044920 A1* | 2/2013 | Langley ................ H04W 12/12 382/115 |

(Continued)

OTHER PUBLICATIONS

Nikitin, Mikhail Yurievich, Vadim Sergeyevich Konushin, and Anton Sergeyevich Konushin. "Face anti-spoofing with joint spoofing medium detection and eye blinking analysis." Компьютерная оптика 43.4 (2019): 618-626. (Year: 2019).*
Feng, Litong, et al. "Integration of image quality and motion cues for face anti-spoofing: A neural network approach." Journal of Visual Communication and Image Representation 38 (2016): 451-460. (Year: 2016).*

(Continued)

*Primary Examiner* — Michelle M Entezari Hausmann
(74) *Attorney, Agent, or Firm* — Harness, Dickey & Pierce, P.L.C.; Anthony G. Fussner

(57) ABSTRACT

A Driver Monitoring System, DMS, configured to detect spoofing attempts, the system comprising: an NIR image sensor module; a light source; a controller configured to control the light source and the image sensor module, so to capture each consecutive image of the sequence in a different lighting condition; a processor having processor operable software, the software comprising: a motion analyzer, operable to analyze a motion in the sequence of images, and output a motion-based result; a first neural network, operable to extract at least one type of information from an at least two channel image created by stacking a set of at least two consecutive images from the image sequence, and output a spatial result; and a fusion program, operable to merge the motion-based and the spatial results, and to output a final result, the final result determining if the target is live or fake.

20 Claims, 4 Drawing Sheets

(51) Int. Cl.
  *G06T 7/20* (2017.01)
  *G06V 10/141* (2022.01)
  *G06V 10/25* (2022.01)
  *G06V 10/54* (2022.01)
  *G06V 10/764* (2022.01)
  *G06V 10/82* (2022.01)
  *G06V 40/40* (2022.01)
  *H04N 23/21* (2023.01)

(52) U.S. Cl.
  CPC .............. *G06V 10/25* (2022.01); *G06V 10/54* (2022.01); *G06V 10/764* (2022.01); *G06V 10/82* (2022.01); *G06V 40/193* (2022.01); *G06V 40/40* (2022.01); *G06V 40/45* (2022.01); *H04N 23/21* (2023.01)

(56) References Cited

U.S. PATENT DOCUMENTS

| | | | | |
|---|---|---|---|---|
| 2015/0248764 | A1* | 9/2015 | Keskin | G06V 10/7625 382/106 |
| 2015/0296135 | A1* | 10/2015 | Wacquant | G06F 3/013 348/207.11 |
| 2018/0034812 | A1 | 2/2018 | Rahman | |
| 2018/0349721 | A1 | 12/2018 | Agrawal et al. | |
| 2019/0044723 | A1* | 2/2019 | Prakash | H04L 9/3234 |
| 2020/0226397 | A1* | 7/2020 | He | G06V 40/172 |
| 2021/0004589 | A1* | 1/2021 | Turkelson | G06V 10/809 |
| 2022/0189110 | A1* | 6/2022 | Tang | G06V 40/40 |
| 2022/0207916 | A1* | 6/2022 | Rassool | G06V 40/20 |

OTHER PUBLICATIONS

Di Martino JM, Suzacq F, Delbracio M, Qiu Q, Sapiro G. Differential 3D facial recognition: Adding 3D to your state-of-the-art 2D method. IEEE transactions on pattern analysis and machine intelligence. Apr. 13, 2020;42(7):1582-93. (Year: 2020).*

Luo Z, Wang Y, Liu N, Wang Z. Combining 2D texture and 3D geometry features for Reliable iris presentation attack detection using light field focal stack. IET Biometrics. Sep. 2022; 11(5):420-9. (Year: 2022).*

Ming Z, Visani M, Luqman MM, Burie JC. A survey on anti-spoofing methods for facial recognition with rgb cameras of generic consumer devices. Journal of imaging. Dec. 15, 2020;6(12):139. (Year: 2020).*

Sun, Xudong, Lei Huang, and Changping Liu. "Context based face spoofing detection using active near-infrared images." 2016 23rd International Conference on Pattern Recognition (ICPR). IEEE, 2016. (Year: 2016).*

Dronky Manar Ramzy et al: "A Review on Iris Liveness Detection Techniques", 2019 Ninth International Conference On Intelligent Computing and Information Systems (ICICIS), IEEE, Dec. 8, 2019, pp. 48-59.

International Search Report and Written Opinion for PCT/EP2021/068192 which is a parent application to the instant application, dated Sep. 28, 2021; 19 pages.

European Search Report for EP20183434.8 which is a parent application to the instant application; dated Nov. 30, 2020; 10 pages.

Mohamed et al.; Visible/Infrared face spoofing detection using texture descriptors; https://doi.org/10.1051/matecconf/201929204006; 2019; 5 pages.

* cited by examiner

ANTI-SPOOFING SYSTEM

This patent application is a U.S. national stage filing under 35 U.S.C. § 371 of PCT International Application No. PCT/EP2021/068192 filed Jul. 1 2021 (published as WO2022/003107 on Jan. 6, 2022), which claims priority to and the benefit of European Application No. 20183434.8 filed Jul. 1, 2020. The entire contents of these applications are incorporated herein by reference.

FILED OF THE INVENTION

The present invention relates to a Driver Monitoring System, DMS, configured to detect spoofing attempts.

BACKGROUND OF THE INVENTION

As technology has increased the ability to accurately determine identity based on various biometrics, they have become increasingly popular as authentication factors. The accuracy of identification using biometrics means that it can ensure authentication and non-repudiation, while the fact that biometrics are intrinsically tied to the person ensures availability without imposed burdens such as remembering passwords, or carrying physical tokens, such as keys. However, with new authentication factors come new potential attack vectors that need consideration for security to be guaranteed. One attack vector could be spoofing, that is presenting falsified biometric data that mimics that of an authorized user. For example, if visual facial features are used as authentication factor, then one could spoof facial features by presenting a picture of the authorized person, or by wearing a mask that looks like them. Thus, for biometric authentication factors to be secure, robust methods for dealing with these attacks need to be developed.

Different approaches for detecting spoof attacks on biometric authentication systems, including facial recognition, have been previously presented, some of which are based on spoof detection based on imagery in the NIR spectrum. In the article "*Visible/infrared face spoofing detection using texture descriptors*", by A. Ghoneim S. Mohamed and A. Youssif, International Conference on Circuits, Systems, Communications and Computers, 23, Sep. 2019, multi-spectral solutions to anti-spoofing, using both NIR-imagery and visible-light imagery has been disclosed. Additionally, this article discloses different approaches including utilizing convolutional Neural networks (CNN), on visual and NIR-data either separately or in conjunction.

SUMMARY OF THE INVENTION

It is however necessary that, the anti-spoofing systems be readily available, and seamlessly functionable in daily situations, for instance within vehicles, where visually-based authentication of a user, e.g. face-recognition, is utterly beneficial. Additionally, it is desirable that integrating these anti-spoofing systems into already existing hardware be possible at a minimum cost.

It is therefore an object of the present invention to provide a feasible anti-spoofing system compatible with the already existing hardware within a vehicle, to enable a more reliable visual identification.

According to a first aspect of the invention, this and other objects are achieved by a Driver Monitoring System, DMS, configured to detect spoofing attempts, the system comprising: an image sensor module, for capturing a sequence of image frames of a portion of a target; a light source, operable to emit IR pulses, the IR pulses having a pulse width, and being temporally separated by a separation time duration; a controller configured to control the light sources and the image sensor, so to capture each consecutive image of the sequence in a different lighting condition, the different lighting conditions corresponding to the IR pulses of the light sources; a processor, and a processor operable software implemented in the processor. The software comprises: a motion analyzer, operable to analyze a motion in said sequence of images, and output a motion-based result; a first neural network, trained to extract at least one type of information from an at least two channel image created by stacking a set of at least two consecutive images from the image sequence, and output a spatial result; a fusion program, operable to merge the motion-based and the spatial results, and to output a final result, the final result indicating if the target is live or fake.

The first neural network is trained to perform 3D shape analysis to extract the at least one type of information, so that said spatial result distinguishes between 2D and 3D shapes. In other words, the first neural network may exploit the 3D information provided by the different lighting conditions of the set at least two consecutive images, and may extract a combination of texture and shape information.

The image sensor module, and the light source may be integrated parts of a DMS system. The images may be taken from at least a portion of the target, say for instance the eye region of a driver, or the entire face of the driver.

According to an embodiment, the fusion program is a classifier, which outputs the final result based on the motion-based result and/or the spatial result. The final result should be understood as an indication whether images acquired by the DMS relate to an actual living person (live) or not (fake).

The fusion program may be a type classifier, for example but not limited to a rule-based classifier, or alternatively, a neural network classifier, which may be trained on pre-registered data. The classifier may determine a result based on the output of any or both motion analyzer and first neural network. For instance, a basic rule-based classifier may simply forward both or either of the motion-based result, and spatial result as the final result. Alternatively, if both the motion-based result and the spatial result determine that the target is "fake", the fusion program may output a final result of "fake", otherwise if the motion-based result and/or the spatial result determine that the target is live, the fusion program may output a final result of "live".

Therefore, the fusion program ensures that the advantage of both types of anti-spoofing systems; i.e. by means of the motion analyzer, and the first neural network are brought together and exploited within one compact, low-cost system.

The motion analyzer may be a tracker, such as an eye tracker, such that the outputted motion-based result may be dependent on results of previous image frames which may have been analyzed prior to the image frames of the sequence.

The reason behind acquiring the sequence of images in different lighting conditions is that a 3D surface may be at least partially reconstructed based on multiple 2D images captured in different lighting conditions, which may typically be referred to as photometric stereo. This is due to the fact that the amount of light reflected from a surface may vary with the angular relationship between the surface, the light source, and the camera.

According to a second aspect of the invention, a method for detecting spoof attempts, using a driver monitoring system, DMS, comprising steps of:

a) emitting IR pulses, the pulses having a pulse width, and being temporally separated by a time duration,
b) acquiring a sequence of image frames of at least a portion of a target such that each consecutive image of the sequence is acquired in a different lighting condition, the different lighting conditions corresponding to the IR pulses;
c) analysing a motion in the sequence of image frames, and outputting a motion-based result; and
d) choosing at least one set of at least two images from the sequence of image frames, such that the two images are taken consecutively,
e) determining a region of interest in the set of at least two images,
f) creating an at least two channel image by appending (or stacking) said at least two images (in a depth-wise manner),
g) feeding said at least two channel image to a first neural network,
h) extracting at least one type of information,
i) outputting a spatial result based on said extracted information,
j) merging said motion-based and spatial results, to obtain a final result determining if the target is live or fake.

As driver monitoring systems (DMS) are becoming standard components for monitoring driver alertness, by for example eye tracking, for traffic safety purposes, they provide a wealth of information relating to the movement of facial features such as the eye and the mouth. The inventors have realized that by using the existing hardware of a DMS in a vehicle, one can combine the already provided information from the DMS with existing approaches for tackling spoofing fraud, such as the use of neural networks, for obtaining an anti-spoofing system in a vehicle with low impact on error rates, low integration costs, and a high execution speed.

Step e may be carried out based on the motion-based results, from which feature locations, including the location of the region of interest may be extracted. Step e may be referred to as frame preparation, in which consecutive image frames may be for example cropped, rotated, translated, etc. to include the region of interest in a pre-determined size.

Depending on the number of images chosen in step d for the set, in step f each appended image will add an additional channel.

The image frames may be acquired by an NIR image sensor module, while the IR pulses may be emitted by at least one light source. Steps c through k and the alternative and/or additional steps mentioned below may all be carried out by a processor comprising a processor implemented software.

The image sensor module may be referred to as a camera assembly, or camera for short. Hence note that, in the context of this application the terms image sensor module and camera are used interchangeably, and unless stated otherwise, are meant to refer to the same component.

In an embodiment the light source is configured to emit IR light continuously. In other words, the separation time duration is arranged to be zero. According to this embodiment, due to the existence of only one lighting condition, the first neural network may only have the possibility of extracting texture information, and not 3D information.

Alternatively, The IR light source may comprise at least two IR light sources separated by a distance from the camera, which is in turn positioned at a certain distance from the target. In an embodiment two light sources spatially separated by a first distance, and arranged to emit IR light alternatingly. It may be that the light sources may be positioned at the furthest distance from one another, such as on either side of the camera. Alternatively, one light source may be positioned at the front of the camera; closer to the target, while the other is positioned on one side of the camera. The spatial separation may allow for obtaining distinct lighting conditions in which the images will be acquired in.

In the case of more than one light source it may be that the pulse width of the IR pulses from each of the light sources are equal. Alternatively, it may be that the pulse width of the IR pulses from each of the light sources are not equal.

The sequence of images may be taken in different lighting conditions that exclusively correspond to the pulse width of the IR pulses. The latter may be a configuration best fitted for embodiments with more than one light source. Additionally, or alternatively, one of the different lighting conditions corresponds to a non-illuminated condition between IR pulses. In other words, some of the images may be acquired during the temporal separation between the pulses so that specific lighting condition is a non-illumination by the light source. In this case, the ambient lighting may provide one of the different lighting conditions.

The consecutive images from the sequence of images preferably have a short temporal distance between them, in order to reduce unwanted significant target movements between them, so that the network may focus on discriminating between live and fake targets. Having said that, the network may be trained to handle any existing motion between the frames, by for instance geometric alignment of the images if the target, and/or the camera, and/or a feature such as an eyelid has moved in between consecutive frames.

Additionally, or alternatively in an embodiment the eye tracking program is configured to detect and compare a reflection against a retina of the target in said sequence of images and feed an outcome to the fusion program. In this embodiment, lighting conditions in which the appearance of the target's pupil may differ may be created and compared. When a retina is illuminated by a light pulse from a close proximity an effect which may be referred to as the "red eye effect" may occur. In this embodiment, the motion analyzer may not necessarily, or explicitly detect facial motions per se, but may detect the existence or non-existence of a reflection off the retina in different lighting conditions, for instance, the motion analyzer may detect whether the pupil is dark or bright. This embodiment may be highly beneficial in detecting spoofs such as 2D prints of a target, or reoccurring video loops in a fast and efficient way. Additionally, or alternatively, the information about the pupil being light or dark may be fed as input to the first neural network. More information about alternative embodiments where information from the motion analyzer may be fed to the first neural network as input can be found further in the text.

Neural networks are successfully used for classification problems in image analysis. In an embodiment, the first neural network is trained to perform texture information analysis to extract the at least one type of information, so that the spatial result is a classification of the target being live, or texturally fake, or spoof, for example a portion of a 2D photograph, a fake object, or a replaying video loop. The fake object may be a mask, a fake human head, such as a doll head, or a mannequin.

In order to extract and analyze texture information, the neural network may be trained to recognize texture information such as color, lines, silhouettes, etc. and differentiate between the texture and/or shape of a live target and a fake target.

The first neural network may be trained to discriminate between "live" or "fake" on an intermediate level. The set of at least two consecutive images may for this purpose be combined together and fed to the first neural network. The first neural network may extract texture information from the fed stacked images.

In an embodiment, the motion-based and spatial results, are both fed as direct input to the fusion program, to output the final result by directly merging said motion-based and spatial results.

Alternatively, in an embodiment, the first neural network additionally functions as the fusion program so that said spatial result is said final result, and/or wherein the motion-based result, i.e. the detected and analyzed motion information from the motion analyzer, is fed as input into the first neural network. In this embodiment, the first neural network is additionally trained to operate on the information from the motion data analysis to extract information on whether the target is live or fake. In this embodiment, the spatial result and the final result may be the same, and the same as the final outputted result from the spoof-detection system. In this embodiment it may be that at least a subset of the motion-based result is used for determining the region of interest in the set of at least two images, for instance to crop the image frames of the set of at least two images and extract the face region of the target.

In yet another alternative embodiment, the motion analyzer additionally functions as the fusion program so that said spatial result outputted from the first neural network is fed as input into the motion analyzer. In this alternative embodiment, the motion analyzer is additionally trained to operate on the information from the first neural network to extract information on whether the target is live or fake. In this embodiment, the motion-based result and the final result may be the same, and the same as the final outputted result from the spoof-detection system.

In a DMS system, it may of course be that more than one sequence of image frames is captured of at least a portion of a target by said NIR image sensor module, consecutively. This may be well in line with the video acquisition functionality of a DMS system. In this case it may be that the motion analyzer is operable to analyze a motion in each sequence of said plurality of sequence of images, and output more than one motion-based result, each motion-based result corresponding to each analyzed sequence of images. Additionally, or alternatively, the first neural network, may be operable to extract at least one type of information from a set of at least two consecutive images from each of said more than one image sequences, and output more than one spatial result, each spatial result corresponding to each sequence of images.

By this the system may benefit from a more reliable spoof detection, due to a larger number of spoof analysis. It may be that the latter is performed with a given frequency throughout the duration of usage, e.g. driving.

Additionally, or alternatively, in an embodiment the processor implemented software further comprises a second neural network trained to perform scene dynamics analysis to extract a second type of information from a plurality of image sequences, and output an iteration result, the iteration result being a second motion-based result, and wherein the iteration result outputted by the second neural network is fed into the fusion program.

In the case that a plurality of sequence of image frames are acquired, other information useful for spoof detection may be extracted by analysing the target over an extended period of time. For this, image frames of each sequence of images may be appended together into one stack, such that each stack of the multiple stack corresponds to one sequence of images. This may add yet another layer of analysis to the spoof detection, in which inconsistencies or repetitions may be detected, and output the iteration result and fed to the fusion program.

This again, may be beneficial for detecting spoof attempts, as an additional layer of spoof detection will reduce the error rate of the calculations, making the spoof detection more reliable.

For example, a recurrent neural network architecture (RNN) may be utilized as the second neural network, to which the multiple stack may be fed. In an embodiment, the second neural network is trained to analyze scene dynamics to extract the second type of information. Scene dynamics may for example refer to the ambient environment of the target, which may in turn refer to the in-cabin environment of a vehicle, and/or the outer environment for example visible through the vehicle window. This may be beneficial for detecting spoofing attempts such as 2D prints of a target presented to the camera, in which the scenery never changes. Additionally, or alternatively, and more importantly, it may be utterly useful in detecting replaying video loops, in which the scenery changes are recurrent over an extension of time, which only one layer of spoof detection, i.e. motion analysis, together with the first neural network analysis (the motion-based and spatial results) may not be capable of detecting.

It may be that the second neural network is operable independent of the motion analyzer and/or the first neural network.

An embodiment includes a further step of calculating a confidence level of at least one of said motion-based result, said spatial result, said iteration result and/or said final result. This may be beneficial to account for possible errors in the system, measurements and/or analysis.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details.

Figures 1A, 1B:
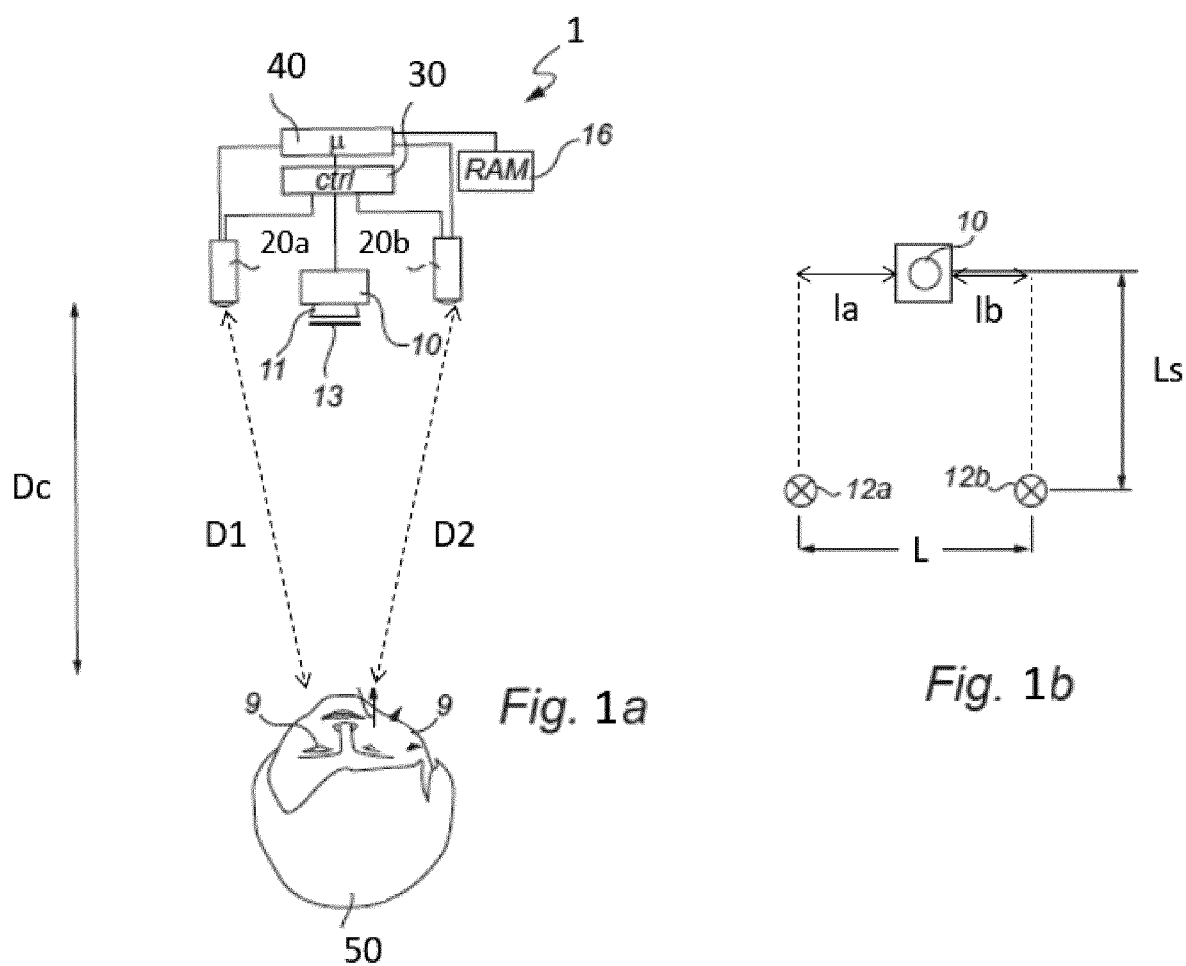
FIGS. 1a and 1b schematically show a DMS system configured to detect spoofing attempts.

FIG. 1a schematically demonstrates a DMS system 1 configured to detect spoofing attempts, i.e. to determine if images acquired by the DMS relate to an actual living person and not e.g. to some artifact like a photo or face mask.

In the illustrated example, the system includes a camera 10 and two infra-read (IR) light sources 20a, 20b. The camera 10 generally may comprise an image sensor that includes an active region, the active region including a plurality of pixels operable to sense radiation substantially in an IR part of the spectrum, an optical assembly 11 disposed over the active region of the image sensor, the optical 11 assembly controlled by a controller 30 and configured to consecutively expose the image sensor to a sequence of exposures, corresponding to the sequence of images, the optical assembly 11 may comprise a shutter, a read-out circuit configured to acquire output signals from the plurality of pixels, one or more image processors configured to generate the sequence of images based on the output signals from the plurality of pixels. The camera 10 further includes an IR or near-IR (NIR) filter 13. The filter 13 may be configured to be withdrawable, for instance in the case of capturing images during the temporal separation of the time duration between the IR pulses. The light sources 20a, 20b may be solid state light sources, such as a LED. In the illustrated example, the light sources 20a, 20b are LEDs configured to emit light with a light spectrum concentrated in a 50 nm band centered around 850 or 940 nm (NIR). The filter 13 may be a band-pass filter, e.g. an interference filter. The filter 13 may be configured to have a pass-band substantially corresponding to the light emission spectrum of the light sources 20a, 20b. Thus, in the above-mentioned example, the filter 13 should have a pass-band of around 825-875 nm, or 915-965 nm. The combination of narrow band illumination and narrow pass-band filtering makes the image acquisition system less sensitive to surrounding light, e.g. sunlight.

In FIGS. 1a and 1b relative distances of some of the latter components from one another and/or from a target 50, 9 are schematically demonstrated. The system 1 is considered to be installed within a vehicle (not shown), positioned such that the camera 10 is situated facing the target, which is the drivers face 50, and/or the drivers eye region 9, (for short referred to as the driver) at a distance of Dc, while the two IR light sources 20a, 20b are situated on either side of the camera, separated by a length of L from one another, a lateral distance of 1a, and 1b from the camera 10, and at a distance of D1 and D2 from the driver 50, 9. Note that in the depicted embodiment 1, the two light sources 20a, 20b are positioned on the same lateral plane with respect to the camera, and/or the driver 50, 9. The vertical distance between the camera 10, and the light sources 20a, 20b, is Lc. It is however notable that, it some embodiments of the DMS system 1, unlike the embodiment shown in FIG. 1, the two light sources 20a, 20b are positioned non-symetrically with relation to the camera 10 and/or target 50, 9. The camera 10 is operable to capture a sequence of image frames from the target 50, 9, while the IR light sources 20a, 20b are configured to emit pulses of IR light alternatingly. The camera 10, and the IR sources 20a, 20b are electronically connected to a controller 30. The controller 30 is configured to control the acquisition of the images frames such that they correspond with the pulse width of the IR pulses emitted from either of the light sources 20a, and 20b, and/or from the temporal separation between each consecutive pulse.

As a practical example, the light sources 20a, 20b are triggered by pulses which have a duty cycle selected to provide sufficient illumination for acquiring one image frame. As mentioned, either one or both light sources 20a, 20b may be activated for an image frame. Preferably, the light sources 20a, 20b are controlled by a pulsed signal with a duty cycle to ensure that the pulse width corresponds to the time required for the camera 10 to acquire one image. The camera 10 is then synchronized with this pulsed signal.

The controller 30 is inturn electronically connected to a processor 40, comprising a processor implemented software. The system also has a memory, such as a RAM memory, e.g. storing software to be executed by the processing circuitry 15.

Figure 2:
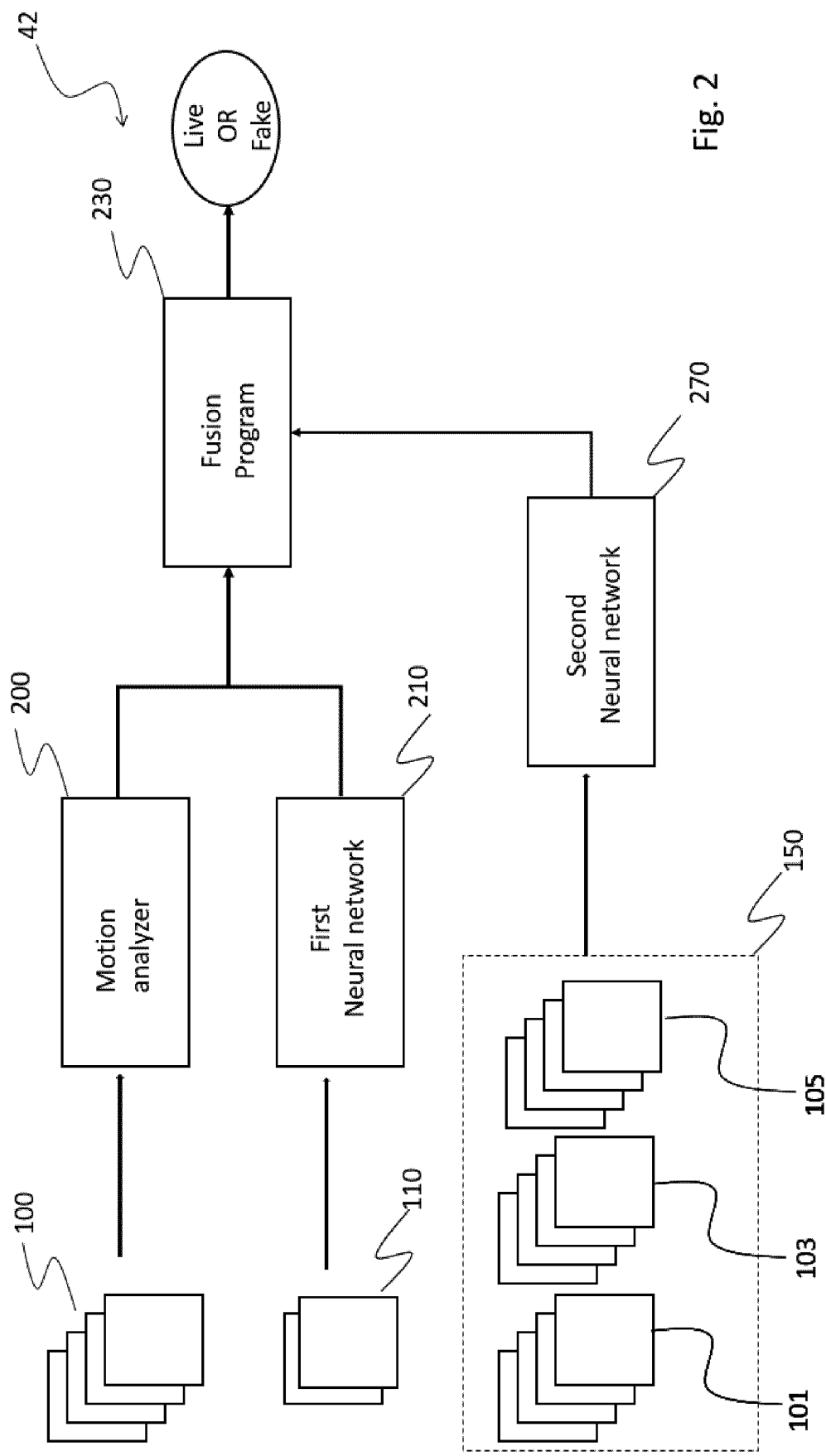
FIG. 2 shows a block diagram of an embodiment of the anti-spoofing system.
Figure 3:
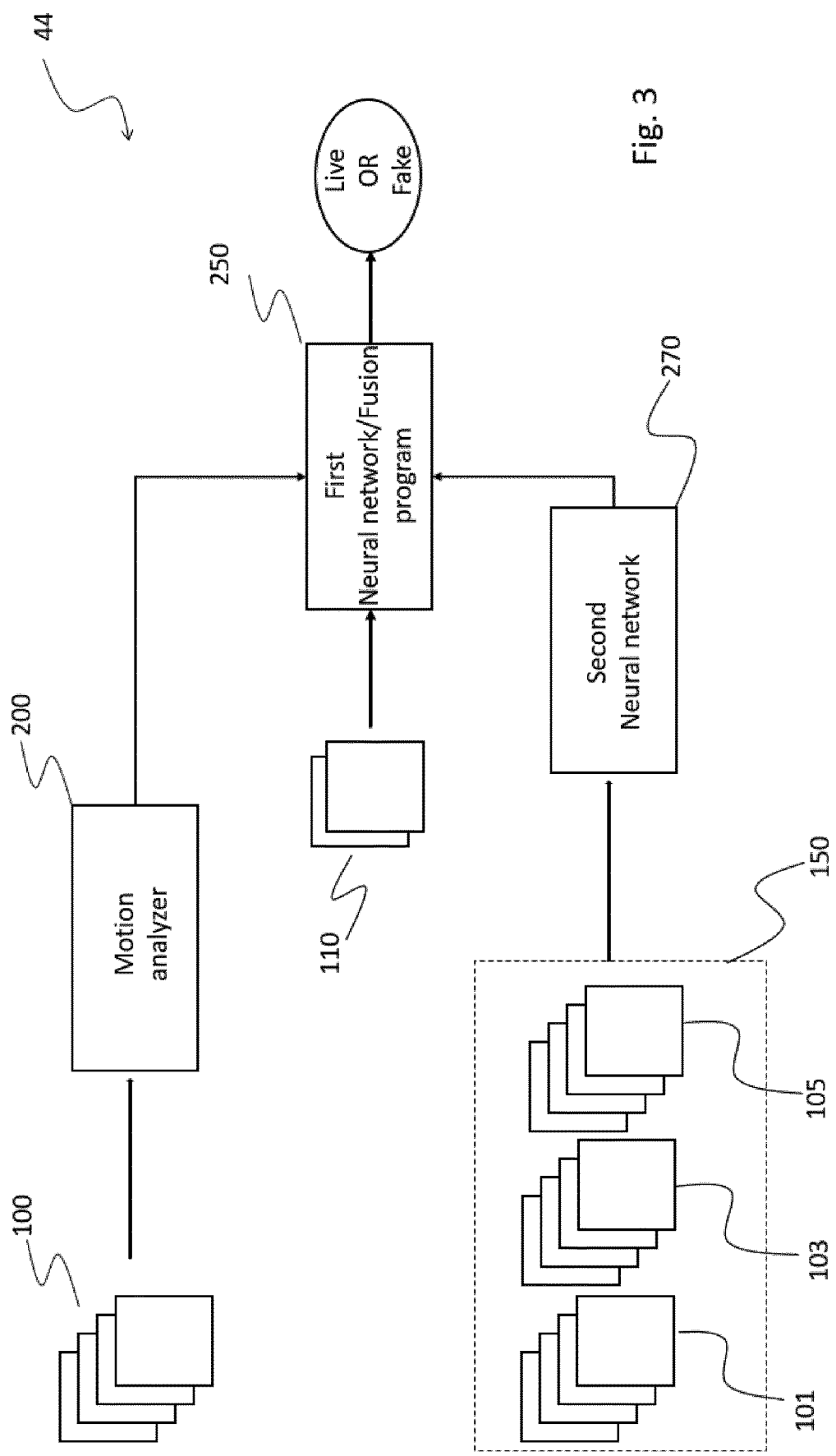
FIG. 3 shows a block diagram of an embodiment of the anti-spoofing system.

FIGS. 2 and 3 demonstrate example embodiments 42, 44 of how the processor implemented software functions.

In the processor implemented software embodiment 42 of FIG. 2, a sequence of consecutive images 100 is configured to be captured by the camera 10 from the target 50, 9 such that each image of the sequence corresponds to a different lighting condition. The sequence 100 may be a selected sequence of image frames of a video clip captured by the camera 10 of the DMS system 1.

As mentioned before, the reason behind acquiring the sequence of images in different lighting conditions is that a 3D surface may be at least partially reconstructed based on multiple 2D images captured in different lighting conditions. It may be that the reconstruction in and of itself is not utilized for the purposes of this invention, but the neural network 210 may extract 3D information through the reconstruction process which may be useful for discriminating a live target 50, 9, from fake.

The sequence 100 is arranged to be fed to a motion analyzer 200, such as a motion analyzer in a DMS system, which in turn is configured to detect, and analyze motion events, for instance detect and analyze facial movement, such as for instance in the eyes, and/or mouth area of the target 50, 9, and/or to estimate a head pose and a gaze of the target 50, 9, and estimate for example drowsiness, and to output an exsistence, or non-exsistence of natural motions of the target 50.

This may be highly beneficial in detecting spoof attacks, for instance, in 2D prints of a target 50, 9 held to the camera 10, and or some facial masks which do not allow for full facial dynamics, for instance, having a fixed mouth. The motion analyzer 200 may compare images in the sequence with one another and detect if the target 50, 9 demonstrates reasonable and/or natural movements.

The motion-based result may then be determining the existence or the non-existence of those movements. This may be implemented in several ways, by for instance, the processor implemented software calculating a confidence level, meaning that for instance, the processor may give a score of in the case that it detects reasonable movements with certainty e.g. 0, while if absolutely no reasonable movements are detected a score of e.g. 1 is given. Typically, the score that an analyzed sequence of images receive may lay between 0 and 1. There may be a predefined threshold between 0 and 1, for which below this threshold the outputted motion-based result may be the existence of reasonable and/or natural motion, hence no spoof detection, while for scores above the threshold value the outputted motion-based result may be non-existence of reasonable and/or natural movements, meaning spoof is detected.

Further, a set 110 of at least two consecutive images from the sequence 100, which have been acquired in different lighting conditions, is arranged to be selected by the processor implemented software.

The images of the set 110 are appended, in other words, are stacked together, and fed to a first neural network, for example a convolutional neural network 210 for texture and 3D shape analysis by the processor implemented software. The image stack, or in other words the two-channel image provides the material from which the first neural network 210 can extract 3D information, and/or the possibility to form an at least partial 3D reconstruction of the target 50, 9 from the different lighting conditions of each of the 2D images of the set 110. The first neural network 210 may classify the data into: Live, 2D prints, or replaying video loops, or masks, or any other type of spoofing attempt after analysis. The outputs from the motion analyzer 200 and the first neural network 210 is arranged to be fed to a fusion program 230, which may be an antispoofing classifier information fusion program, and are merged to output a final result of the target 50 being "live" or "fake".

A Convolutional Neural Network (CNN) may be used for example, in order to extract and analyze information such as, but not limited to texture information. To give an example of texture analysis, one may refer to the ability to discriminate between natural looking features, and artifacts. In the eye openings in some facial masks for example, double edges may be detectable, as there may be some inconsistency between the texture of the mask openings and the underlying real eye.

Images taken in different lighting conditions may reveal different information from the target 50, 9. Before the image set is fed to the neural network 210, the set of at least two consecutive images 110 are arranged to be stacked onto one another, such that they create an at least two channel image. By this it is meant to convey that, the information of each image frame of the set 110 is combined in a depth-wise manner so to provide an at least partial 3D construction of the target 50, 9.

It is notable that prior to use, the neural network 210 is trained. For this purpose, for example, frames are extracted from recordings made in a data collection, and prepared such that, for example, consecutive image frames may be cropped, rotated, translated, etc. to include the region of interest in a pre-determined size. Frames extracted from spoof recordings may be labeled 0, while frames extracted from live recordings may be labeled 1. The frames are then divided so that all recordings of randomly chosen subjects are used as training data, and the rest as validation data. Frames from mask recordings are divided so that frames with some of the masks were used for training, while frames with other masks are used for validation. It is necessary to note that, prior to training and validation data is normalized samplewise and/or feature-wise based on the statistics from the training data set. In the case that the training data set is relatively small, variation may be introduced by augmentation of the training data. The utilized optimizer may be for example, "Adam", or the "SGD" classifier. Binary cross-entropy may be used as the cost function. In order to reduce the learning rate as accuracy improvement halts, a learning rate scheduler may be used to iteratively update the rate.

Similar to the motion-based result, the determination and outputting the spatial result may be implemented in several ways, by for instance, the processor implemented software calculating a confidence level, meaning that for instance, the processor may give a score of e.g. 1 in the case that it detects texture discrepancies, and or distinguished 2D from 3D with certainty, while if absolutely no texture discrepancies are detected, and/or 3D structure of the target is determined with certainty a score of e.g. 0 is given. Typically, the score that an analyzed sequence of images receives may lay between 0 and 1. There may be a predefined threshold between 0 and 1, for which above this threshold the outputted spatial result may be the existence of texture discrepancies, and/or 2D structures of the target, hence spoof is detected, while for scores below the threshold value the outputted spatial result may be minimal texture discrepancies, or 3D structure of the target, hence no spoofing attempt has occurred. Calculating a confidence level may be beneficial when accounting for errors in the system for example, which may be disregarded.

In the embodiment 42, of FIG. 2, an additional layer of spoof detection is depicted. Note that, the spoof detection may function independent of this additional layer, and the existence of this layer may add an extra degree of spoof detection to the readily explained embodiment 42. The additional layer comprises capturing multiple sequences of image frames 101, 103, 105 from the target 50. Each of the images in each of the sequences 101, 103, 105 are arranged to be taken at different lighting conditions. These sequences may be arranged to be acquired temporally consecuent to one another as it is with video acquisition. The images in each sequence 101, 103, 105 are arranged to be combined with one another, resulting in a multiple stack 150 of images. This multiple stack 150 is arranged to then be fed as input to a second neural network 270 by the processor implemented software. The second neural network may be for example, a recurrent neural network (RNN), in which inconsistencies or repetitions may be detected, and analyzed and an iteration result will be outputted. The output is then fed to the fusion program 230, 250, configured to merge the iteration result with the other outputs and to output a final result of the target 50 being "live" or "fake".

It is again notable that, the second neural network 270 may be trained prior to use.

Again, the determination and outputting of the final result can be implemented in several ways, by for instance, the processor implemented software calculating a confidence level at the final layer.

In the alternative processor implemented software embodiment 44 of FIG. 3, similar to FIG. 2, the sequence of images 100 captured from the target 50 is arranged to be fed to the motion analyzer 200 to detect, and analyze motion events, and output an exsistence, or non-exsistence of natural motions of the target 50. However, unlike the latter embodiment 42, in the embodiment 44 of FIG. 3, the output from the motion analyzer 200 is arranged to be fed as input together with the combined set of at least two selected consecutive images 110 from the sequence 100, to a first neural network 250, which not only performs texture and 3D shape analysis on the inputted data, but will also perform fusion, to output a final result of the target 50 being "live" or "fake".

Similar to the embodiment 42, of FIG. 2, in the embodiment 44 of FIG. 3, an additional layer of spoof detection is depicted. Note that, again the spoof detection may function independent of this additional layer, and the existence of this layer may add an extra degree of spoof detection to the readily explained embodiment 44. The additional layer is configured to perform the same steps mentioned for that of embodiment 42, and therefore reference is made to that description.

Figure 4:
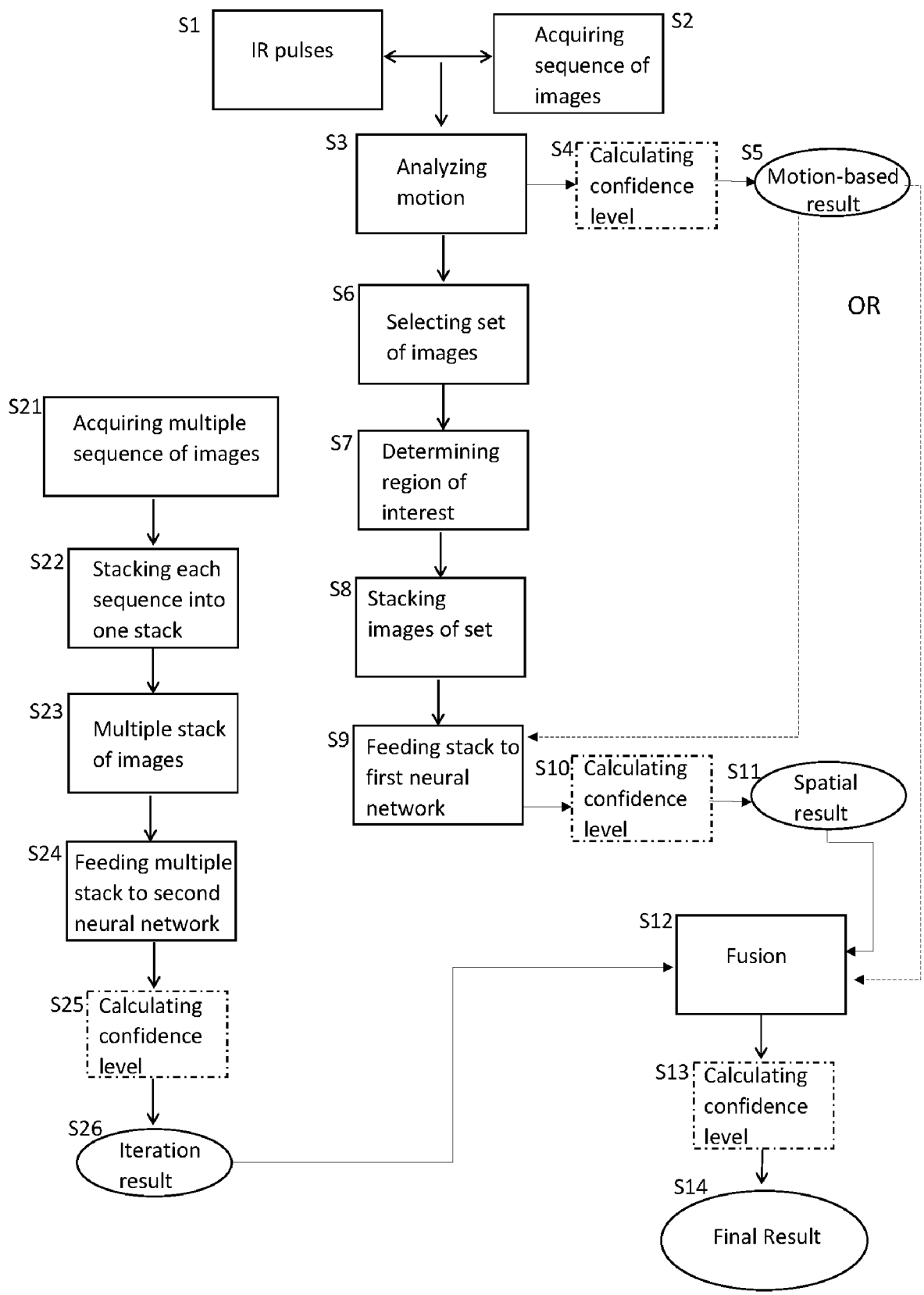
FIG. 4 shows a flowchart of a method for detecting spoofing attempts.

FIG. 4 shows a flowchart of a method for detecting spoofing attempts using the system in FIGS. 1-3. In S1 the light sources 20a, 20b emit IR pulses with a given time duration, and a given temporal separation. In step S2, simultaneously with each IR pulse and/or in the separation of the time duration in between each consecutive IR pulse, the camera 10 acquires a sequence of images 100 of the target 50, 9 in different conditions created by the alternating IR pulses. Therefore, steps S1 and S2 are required to be carried out in conjunction with one another. As an example, in one configuration with a rate of 120 frames per second, and a two-flash configuration where alternative IR pulses from the light sources 20a and 20b construct the different lighting conditions, the pulse width of the IR pulses, hence the image acqusition time of the camera is set to 350 μs. In this configuration where the available period for each frame would be 8333 μs, each IR pulse is started 500 μs into the period, and is ended after 350 μs. Therefore, an effective frame rate of 60 frames per second will be achieved for the mentioned two-flash configuration. In a configuration with the same frame rate of 120, and a four-flash configuration thus, an effective frame rate of 30 frames pers second may be reached.

In S3, the motion analyzer 200 of the processor implemented software analyzes the sequence of images 100 for detecting existence of natural and/or reasonable motions of the target 50, 9. The motion analyzer 200 calculates a confidence level in S4 in order to detect the existence or non-existence of the mentioned motions, and to compensate for possible error of the system, and/or measurements. Note that, S4 is not an essential step for performing the method as shown in the example embodiment of FIG. 4, and may be neglected, or alternatively, replaced with other measures. In S5, the motion analyzer 200 outputs a Motion-based result.

In S6 a set of at least two consecutive images 110 acquired at different lighting conditions are selected from the sequence of images 100. In S7 a region of interest is determined in the set of at least two images 110. This region of interest could for example be the eye region of the target 50, 9, or the entire face region. This step may be referred to as frame preparation, in which consecutive image frames may be for example cropped, rotated, translated, etc. to include the region of interest in a pre-determined desired size. Note that, the frame preparation, e.g. cropping is typically done based on the motion-based results. The tracker may provide for example facial feature coordinates which may be used to determine the crop. Alternatively, other methods, such as utilizing a face detector may be used for achieving the latter, which would then render the anti-spoofing feature independent of the motion analyzer.

In S8 the images of the set of at least two consecutive images 110 are stacked onto one another in a depth-wise manner as previously explained, in order to create an at least two channel image. Note that each consecutive image taken in different lighting conditions of the set will add a channel. For instance if more than two consecutive images, for example three of four images taken in different lighting conditions are chosen for the set of images 110, and stacked onto one another, then a three- or four-channel image will be created. In S9 the stack is fed to a first neural network that will preform classification of the set by analyzing its texture information and/or distinguishing 2D from 3D structures. The first neural network calculates a confidence level in S10 for the existence of texture discrepancies, and/or 2D structures of the target, and to compensate for possible error of the system, and/or measurements. Note that, similar to S4, S10 is not an essential step for performing the method as shown in the example embodiment of FIG. 4, and may be neglected, or alternatively, replaced with other measures. Alternatively, it is not necessary that calculating the confidence level is a post-processing step. In this case, the confidence level may be computed by the first neural network itself, meaning that S10 and S9 may be combined into one step. In S11 the first neural network outputs a spatial result.

Note that in one alternative path shown in the flowchart, the motion-based result of S5 may be fed as input to the neural network S9 together with the image stack. In an alternative path, the motion-based result of S5 can be fed together with the spatial result to a fusion program in S12, which will merge the input information, possibly calculate a confidence level in S13 and output a final result in S14 classifying the target 50 as "live" or "fake".

An independent set of steps S21-S26 is visible on the left side of the flowchart shown in FIG. 4, which adds an extra layer of spoof detection to the method. In S21 multiple sequences of image frames 101, 103, 105 are captured from the target 50, 9 Such that each of the images in each of the sequences 101, 103, 105 are taken at different lighting conditions. These sequences acquired temporally consequent to one another. In S22 the images in each sequence 101, 103, 105 are stacked onto one another, resulting in a multiple stack 150 of images in S23. This multiple stack 150 is then fed as input to a second neural network 270 in S24. The second neural network may be for example, a recurrent neural network, in which inconsistencies or repetitions may be detected, and analyzed, and a confidence level may be calculated as shown in S25, and an iteration result will be outputted in S26. The output if S26 is then fed to the fusion program in S12 to be merged with the other outputs of S11, and S5 and output a final result of the target 50, 9 being "live" or "fake".

The person skilled in the art realizes that the present invention by no means is limited to the preferred embodiments described above. On the contrary, many modifications and variations are possible within the scope of the appended claims. For example, the details of the DMS may be different than those disclosed herein. Further, the pulse width and pulse separation may be adjusted based on the implementation, as may the number of frames or sets of frames used as input to the neural networks.

The invention claimed is:

1. A Driver Monitoring System, DMS, configured to detect spoofing attempts, the system comprising:
   an NIR image sensor module, for capturing a sequence of image frames of a portion of a target;
   a light source, operable to emit IR pulses, said pulses having a pulse width, and being temporally separated by a separation time duration;
   a controller configured to control said light source and said image sensor module, so to capture each consecutive image of the sequence in a different lighting condition, said different lighting conditions corresponding to said IR pulses of the light source;
   a processor, and a processor operable software implemented in said processor, said software comprising:
   a motion analyzer operable to detect and analyze motion events in said sequence of images in different lighting conditions, and output a motion-based result indicative of an existence or non-existence of natural motions in said sequence of images;
   a first neural network trained to perform 3D shape analysis on an image stack created by stacking a set of at least two consecutive images (in a depth-wise manner) from said image sequence in different lighting conditions, and output a spatial result including a 2D/3D classification of the stacked image distinguishing between a 2D shape or a 3D shape for the purpose of anti-spoofing, wherein the first neural network is operable to extract 3D information from an image stack of consecutive 2D images stacked in a depth-wise manner and captured in different lighting conditions to thereby form an at least partial 3D reconstruction of the target from the different lighting conditions of each of the 2D images of the image stack; and a fusion program operable to merge said motion-based result and said spatial result, and to output a final result, said final result indicating if the target is live or fake.

2. The system according to claim 1, wherein the fusion program is a classifier, and wherein said classifier outputs said final result based on the motion-based result and/or the spatial result.

3. The system according to claim 1, wherein said motion analyzer is an eye tracking program configured to identify a set of eye features and a glint position in an eye region of the image frames of the target, and determine a gaze direction based on said glint position and said eye features.

4. The system according to claim 3, wherein said eye tracking program is additionally configured to detect and compare a reflection against a retina of the target in said sequence of images and feed an outcome to the fusion program.

5. The system according to claim 1, wherein the light source comprises at least two IR light sources spatially separated by a first distance and arranged to emit IR light alternatingly.

6. The system according to claim 1, wherein one of the different lighting conditions corresponds to a non-illuminated condition between IR pulses.

7. The system according to claim 1, wherein the first neural network is further trained to perform texture information analysis on said image stack so that said spatial result includes a classification of the target being live or texturally fake.

8. The system according to claim 1, wherein said first neural network additionally functions as the fusion program wherein said motion-based result is fed as input to the first neural network so that said spatial result is said final result, or wherein said motion analyzer additionally functions as the fusion program wherein said spatial result is fed as input to the motion analyzer so that said motion-based result is said final result.

9. The system according to claim 1, wherein said processor implemented software further comprises a second neural network trained to perform scene dynamics analysis to extract an iteration result, which is fed into said fusion program.

10. The system according to claim 9, wherein the second neural network and the first neural network are the same neural network.

11. The system according to claim 1, wherein the first neural network is further trained to perform texture information analysis on said image stack to extract and recognize at least one type of texture information including one or more of color, lines, and/or silhouettes for differentiating between the texture and/or shape of a live target and a fake target.

12. The system according to claim 1, wherein the motion analyzer is configured to detect and analyze facial movement including in the eyes, mouth area, and/or eyelid movement between consecutive images in said sequence of images in different lighting conditions.

13. The system according to claim 1, wherein the motion analyzer is configured to analyze said sequence of images in different lighting conditions to estimate a head pose, a gaze, and/or drowsiness of the target.

14. A method for detecting spoof attempts, using a driver monitoring system, DMS, comprising steps of:
    a) emitting IR pulses, said pulses having a pulse width, and being temporally separated by a separation time duration;
    b) acquiring a sequence of image frames of at least a portion of a target such that each consecutive image of the sequence is acquired in a different lighting condition, said different lighting conditions corresponding to the IR pulses;
    c) analysing motion events in said sequence of image frames in different lighting conditions, and outputting a motion-based result indicative of an existence or non-existence of natural motions in said sequence of images;
    d) choosing at least one set of at least two images from said sequence of image frames, such that said at least two images are taken consecutively;
    e) determining a region of interest in said set of at least two images;
    f) creating a stacked image with at least two channels by stacking said set of at least two images in a depth-wise manner;
    g) feeding said stacked image to a first neural network trained to perform 3D shape analysis, and output a spatial result including a 2D/3D classification of said stacked image distinguishing between a 2D shape or 3D shape for the purpose of anti-spoofing, wherein the first neural network is operable to extract 3D information from an image stack of consecutive 2D images stacked in a depth-wise manner and captured in different lighting conditions to thereby form an at least partial 3D reconstruction of the target from the different lighting conditions of each of the 2D images of the image stack; and
    h) merging said motion-based result and said spatial result, to obtain a final result determining if the target is live or fake.

15. The method according to claim 14, wherein the motion-based result of step c is also provided to the first neural network.

16. The method according to claim 14, further comprising the steps of:
    performing scene dynamics analysis for extracting a second type of information from a plurality of image sequences, and outputting an iteration result, said iteration result being a second motion-based result, and merging said iteration result in step j to obtain a final result.

17. The method according to claim 14, comprising a further step of calculating a confidence level of at least one of said motion-based result, said spatial result, said iteration result and/or said final result.

18. The method according to claim 14, wherein the first neural network is further trained to perform texture information analysis on said image stack to extract and recognize at least one type of texture information including one or more of color, lines, and/or silhouettes for differentiating between the texture and/or shape of a live target and a fake target.

19. The method according to claim 14, wherein the method includes detecting and analyzing facial movement including in the eyes, mouth area, and/or eyelid movement between consecutive images in said sequence of images in different lighting conditions.

20. The method according to claim 14, wherein the method includes analyzing said sequence of images in different lighting conditions to estimate a head pose, a gaze, and/or drowsiness of the target.

* * * * *